US007877784B2

(12) United States Patent
Chow et al.

(10) Patent No.: US 7,877,784 B2
(45) Date of Patent: Jan. 25, 2011

(54) VERIFYING AUTHENTICITY OF WEBPAGES

(75) Inventors: Stanley Chow, Ottawa (CA); Jeff Smith, Kanata (CA); Christophe Gustave, Ottawa (CA)

(73) Assignee: Alcatel Lucent, Paris (FR)

( * ) Notice: Subject to any disclaimer, the term of this patent is extended or adjusted under 35 U.S.C. 154(b) by 888 days.

(21) Appl. No.: 11/811,235

(22) Filed: Jun. 7, 2007

(65) Prior Publication Data

US 2008/0307222 A1   Dec. 11, 2008

(51) Int. Cl.
*H04L 9/32* (2006.01)
*H04L 9/00* (2006.01)

(52) U.S. Cl. .............. 726/2; 726/10; 713/168; 713/173; 713/175

(58) Field of Classification Search ......... 713/155–157, 713/168–170, 173, 175, 161; 726/1–5, 10
See application file for complete search history.

(56) References Cited

U.S. PATENT DOCUMENTS 6,615,350 B1 * 9/2003 Schell et al. ............... 713/168
7,664,948 B2 * 2/2010 Moreau ..................... 713/156

* cited by examiner

*Primary Examiner*—Hosuk Song
(74) *Attorney, Agent, or Firm*—Galasso & Associates, LP

(57) ABSTRACT

A certificate registry system is configured to issue authentication certificates issued to each one of a plurality of information providers and to maintain a root certificate corresponding to all of the authentication certificates. Each one of the authentication certificates links respective authentication information thereof to identification information of a corresponding one of the information providers. Each one of the authentication certificates is devoid of linkage between the corresponding one of the information providers and domain name information thereof. The authentication certificates of the certificate registry are associated in a manner at least partially dependent upon at least one of a particular type of information that the information providers provide, a particular organization that the information providers are associated with, a particular type profession in which the information providers are engaged and a particular geographical region in which the information providers are located.

22 Claims, 7 Drawing Sheets

VERIFYING AUTHENTICITY OF WEBPAGES

FIELD OF THE DISCLOSURE

The disclosures made herein relate generally to authentication provisions in computer network systems and, more particularly, to verifying authenticity of webpages.

BACKGROUND

For any number of reasons, the need to verify authenticity of e-mail message senders cannot be understated. Such authentication needs to provide an alert when identification information of a sending entity designated in an e-mail message cannot be authenticated. Examples of sender identification information provided in an e-mail message includes, but is not limited to, a sending entity's name, logo, audible sound, etc. While it would be useful to know who is the entity sending fraudulent and malicious e-mail messages, there is tremendous value in simply knowing that the sender identification information provided in an e-mail message has passed or failed a trusted authentication process. Similarly, there is value in knowing that an e-mail message sender has or has not been successfully authenticated even though the authentication does not identify the person or entity sending a fraudulent or malicious e-mail message.

The lack of an effective and practical means for providing such e-mail message authentication has lead to rapid growth of the criminal activities such as, for example, "phishing". In phishing, a criminal typically sends an email to a recipient under the guise that the e-mail message has been sent from a reputable and/or trusted entity such as, for example, a financial institution, an on-line service provider or the like. The e-mail message entices the recipient to reply with confidential information (e.g., via a link to a fraudulent website where confidential information can be entered). If obtained, the criminal uses the confidential information to compromise a corresponding account or accounts of the e-mail message recipient. Examples of the confidential information include, but are not limited to, information used for accessing a bank account, an investment account, an on-line payment service account, an on-line auction account or the like. With this information, the criminal typically steals funds from a corresponding account or uses such account information to facilitate financial scams against other persons or entities using the identity of the recipient. Unfortunately, phishing is a large and growing problem, with phishing techniques becoming stealthier as often as each week.

With respect to authentication of an e-mail message sender, one known solution is Sender Policy Framework (SPF). SPF attempts to confirm that an email message came from a machine that is designated as being allowed to send email messages from that domain. Unfortunately, there is no check for the legitimacy of the domain. So, anyone can register a domain like 'x-company-special-on-TV.com' and claim to be sending email messages from x-company.

Hoax e-mail messages represent another situation in which it would be beneficial to authenticate the sender of email messages. For example, many hoax emails are purported to be from an authoritative source, whereas they are obviously not. But, there is currently no way for the recipient of an e-mail message to effectively and practically authenticate the sender identity. Denials from the actual authoritative source rarely manage to suppress these hoax e-mail messages.

Unsolicited mass e-mailings, also generally referred to as "Spam", are widespread. Despite all of the attempts at controlling Spam, its rate of occurrence continues to increase and is now estimated to make up a large majority of all email messages. Accordingly, there is clearly a need to reduce the frequency and quantity of Spam. Furthermore, it is not surprising that these unsolicited mass e-mailings typically have header information falsely indicating that the e-mail messages are from legitimate and/or trusted entities. Authentication of header information would provide a means for limiting the amount of Spam that a person receives, in addition to limiting the potential for being the subject of associated fraudulent activity such as phishing.

Fraudulent webpages are often set-up and often used to support phishing activities initiated via e-mail messages. These fraudulent websites appear to be that of a trusted institution, but are actually set-up for the specific purpose of committing criminal activities. Accordingly, there is great value in verifying an entity that is in control of the webpage and/or website.

Like e-mail messages and webpages, Instant Messaging (IM) systems are yet another network-based communication approach where criminal or deceitful activity is typically perpetrated though the use of a false identity. Authentication of an IM screen name designated as the sender of an IM message is desirable, as is authentication that the IM screen name is from a particular institution. Without such authentication, confidential information can be readily compromised, directly or indirectly, through communications using IM.

Presently, there are no complete and/or effective solutions for authenticating an entity purported to be responsible for providing an e-mail message, a website/webpage and/or an Instant Messaging (IM) message to a recipient. As such, phishing, Spam and other types of criminal and deceitful activities based on falsified identity information and committed over data communication networks continues to persist and grow. There are a number of pieces to solutions or partial solutions that are related to the solving the problems of such criminal and deceitful activities based on falsified identity information, but which in fact do not fully solve or adequately address these problems.

One known solution that attempts to confirm that a webpage is coming from the actual owner of a corresponding URL (Uniform Resource Locator) is the Domain Name System (DNS) in combination with SSL/TLS (Secure Socket Layer/Transport Layer Security) protocol, which is also known as HTTPS (i.e., HyperText Transport Protocol with SSL protection). Unfortunately, several factors conspire to make such a solution inadequate. One factor that makes this known solution less than effective is that many companies use multiple domain names and these domain names come and go with no consistent rules. For example, x-company may register "x-company" in all the important top-level domains (e.g., x-company.com, x-company.net, x-company.org, etc) and also in each country domain (e.g., x-company.ca, etc). However, for a special promotion, x-company may have the x-company-TV.com domain name, but not the x-company-TV.ca domain name. This means consumers can be easily confused when presented with the domain names: x-companyTV.com, x-company -TV-special.com, etc. Another factor that makes this known solution less than effective is that companies often have subsidiaries and other corporate entities, which are created with little fanfare. It is difficult for the average consumer to keep track of all these domain names. Still another factor that makes this known solution less than effective is that there are often multiple companies that legitimately have the same name. The most frequent case is where the two companies operating in different jurisdiction. The DNS ownership model is essentially first come-first serve, with a dispute resolution mechanism in place. So, it is essentially impossible for consumers to know which of the multiple entities owns the "most obvious" domain name, or that the company they want uses a non-obvious domain name. Still another factor that makes this known solution less than effective is that many numeric digits and/or text letters look alike. One classic approach for using numeric digits and text letters for deceitful purposes with respect to falsified identity information is substituting the numeric digit "0" for the upper case letter "O" or numeric digit "1" for lower case letter "L". In recent days, there are much more sophisticated ruses using Cyrillic characters or Unicode characters. This allows the criminals to have fake domain names that are essentially visually indistinguishable from the real domain names. There is a whole class of software that tries to use blacklist as well as heuristics to identify these fake domain names. But, this software suffers from the problems of network overhead as well as taking time to add rogue domains to the blacklist. Yet another factor that makes this known solution less than effective is that Spam email has grown to be a huge problem. Most filtering efforts have taken the approach of looking at e-mail message content to identity the currently popular Spam topics such as, for example, on-line purchase of prescription medications. State-of-the-art Spam now uses images as well as misspelling to get past these filters.

Recently, an authentication methodology referred to as "EV Certificate" (Extended Validation Certificate) has been introduced. As the name implies, it has the same foundation as the standard (i.e., non-EV) SSL/TLS certificates, but with extra validation. Most of the problems explained above with respect to standard (i.e., non-EV) SSL/TLS certificates still apply. It is believed that EV Certificates will only help track down a perpetrator of fraudulent activity (e.g., phishing) after such fraudulent activity has been perpetrated as opposed to preventing such fraudulent activity. Obviously, the perpetrator is often times a shell entity in an environment with little or no on-line fraud policing budget or interest in policing fraudulent or malicious on-line activities. Accordingly, even though EV Certificates do help in some ways, they don't appear to actually solve the problem of phishing.

Therefore, regardless of whether the network-based communication approach is e-mail, a webpage and/or Instant Messaging, a solution that overcomes at least a portion of the drawbacks associated with known approaches for combating network-enabled criminal and deceitful activity that is based on falsified or otherwise dishonest identity information would be useful, advantageous and novel.

SUMMARY OF THE DISCLOSURE

Embodiments of the present invention overcome drawbacks associated with known approaches for combating network-based criminal and deceitful activity that is based on falsified or otherwise dishonest identity information. More specifically, embodiments of the present invention provide for authentication of identity information corresponding to an entity designated as the sender of an e-mail message, an entity having ownership of a webpage and/or an entity designated as the sender of an Instant Messaging (IM) message. Through such authentication, a recipient of the identity information can be reasonably assured that they are truly engaging in a network-based communication session with the purported entity, thereby reducing the potential for unknowingly partaking in fraudulent or malicious activities.

The present invention relies upon registries descriptively referred to herein as "RealName registries" and associated authentication certificates (i.e., RealName certificates). Each RealName registry functions as a certificate authority for identification information. Examples of identification information in accordance with the present invention include, but are not limited to, a name by which an entity is recognized, an image specific to an entity, text specific to an entity, and a sound specific to an entity. By de-coupling the "identification" function from DNS (Domain Name Server) and other tools, RealName registries can be used advantageously to achieve useful functionality with respect to the intricacies of facilitating authentication of e-mail messages, IM messages, webpages and the like.

Domain names are used for many functions—including load sharing, organization tracking, web-site hierarchy and so on. These functions have different requirements that make it difficult to handle the identification function as well. For identification, it is preferred for the registry to resolve all the problems of duplicate (and near duplicate) identification information. Clearly, this cannot be done on a worldwide basis and, thus, embodiments of the present invention preferably configured in a manner whereby they respect jurisdictional boundaries. Fortunately, there is a model for this functionality—a trademarks registry. Each jurisdiction has its own trademarks registry, with possibly different rules for resolving ownership of a trademark and different rules for determining whether proposed identification information (e.g., a name) infringes an existing trademark. It is disclosed herein that RealName registries operate in effectively the same manner as trademarks registries. In fact, it is advantageous for RealName registries to be even more decentralized than trademark registries. For example, each jurisdiction can operate its own RealName registry, each profession can operate its own RealName registry, each trade association can operate its own RealName registry, etc. An information recipient (e.g., a recipient of e-mail, a recipient of IM messages, a recipient of webpages, etc) can pick and choose which registries they are willing to import. At a minimum, the information recipient will typically import RealName registries for the local jurisdiction and the profession that the information recipient deals with. This arrangement of RealName registries sidesteps many problems, including the many legal disputes that plague the DNS system, the fraudulent (but visually identical) domain names, un-ambiguous rules on domain name ownership (e.g., does x-company Inc. own the x-company rocks.com site), etc.

With the registries in place, authentication of e-mail messages, IM messages, web pages and the like can proceed. Each registry operates as an issuer of "Certificate of approved name" as well as a database of "approved" identification information (i.e., generally referred to as RealNames). The certificates (i.e., authentication certificates) can be accomplished in many ways, but the simplest is the X.509 authentication certificates that are used for existing DNS/SSL. X.509 is a standardized public key infrastructure (PKI). In X.509 parlance, each registry operates as the "Certificate Authority" and each authentication certificate is essentially a package embedding the RealName and the public key. This package is then signed by the private key of the certificate authority. In operation, the authentication certificates are configured to include essentially any type of identification information useful for reinforcing an entity's identity.

In one embodiment of the present invention, a method for authenticating a webpage comprises a plurality of operations. An operation is provided for creating a certificate registry including authentication certificates issued to each one of a plurality of information providers and a root certificate corresponding to all of the authentication certificates. Each one of the authentication certificates links respective authentication information thereof to identification information of a corresponding one of the information providers. Each one of the authentication certificates is devoid of linkage between the corresponding one of the information providers and domain name information thereof. The authentication certificates of the certificate registry are associated in a manner at least partially dependent upon at least one of a particular type of information that the information providers provide, a particular organization that the information providers are associated with, a particular type profession in which the information providers are engaged and a particular geographical region in which the information providers are located. An operation is provided for providing the root certificate to an information recipient. An operation is provided for facilitating verification of a webpage accessed by the information recipient and having an authentication certificate associated therewith. The verification includes successfully verifying authenticity of the associated authentication certificate using authentication information contained in the root certificate thereby verifying that the associated authentication certificate belongs to the certificate registry and, after successfully verifying authenticity of the associated authentication certificate, successfully verifying identity of a designated owner of the webpage using authentication information contained in the associated authentication certificate.

In another embodiment of the present invention, a certificate registry comprises authentication certificates issued to each one of a plurality of information providers and a root certificate corresponding to all of the authentication certificates. Each one of the authentication certificates links respective authentication information thereof to identification information of a corresponding one of the information providers. Each one of the authentication certificates is devoid of linkage between the corresponding one of the information providers and domain name information thereof. The authentication certificates of the certificate registry are associated in a manner at least partially dependent upon at least one of a particular type of information that the information providers provide, a particular organization that the information providers are associated with, a particular type profession in which the information providers are engaged and a particular geographical region in which the information providers are located.

In another embodiment of the present invention, a certificate registry system is configured to issue authentication certificates issued to each one of a plurality of information providers and to maintain a root certificate corresponding to all of the authentication certificates. Each one of the authentication certificates links respective authentication information thereof to identification information of a corresponding one of the information providers. Each one of the authentication certificates is devoid of linkage between the corresponding one of the information providers and domain name information thereof. The authentication certificates of the certificate registry are associated in a manner at least partially dependent upon at least one of a particular type of information that the information providers provide, a particular organization that the information providers are associated with, a particular type profession in which the information providers are engaged and a particular geographical region in which the information providers are located.

These and other objects, embodiments, advantages and/or distinctions of the present invention will become readily apparent upon further review of the following specification, associated drawings and appended claims.

DETAILED DESCRIPTION OF THE DRAWING FIGURES

The present invention permits interested parties to offer authenticated identification information to anyone whom has access to data communication equipment programmed in accordance with the present invention. Examples of identification information include, but are not limited to, a name by which an entity is recognized, an image specific to an entity, text specific to an entity, and a sound specific to an entity. More specifically, examples of identification information include, but are not limited to, a protected name of an entity, a protected image of an entity, protected text of an entity, and protected sound of an entity. Protected is defined herein to include protection provided by a governing body means such as, for example, a trademark, a copyright, and other forms of registration of identification information and/or creating branded identification information (e.g., trademarks). Data communication equipment refers to computer and/or telephony equipment configured for communicating data over a telecommunication and/or computer network. Examples of such data communication equipment includes, but is not limited to, a computer configured for communicating via e-mail messages, a computer configured for communicating via Instant Messaging, a telephone configured for communicating via Instant Messaging, a computer configured for accessing webpages, a telephone configured for sending e-mail messages and a telephone configured for accessing webpages.

Data communication equipment programmed in accordance with the present invention includes one or more identification information registries (i.e., one or more RealName registries) and one or more information provider authentication applications. Each identification information registry is configured for storing unique identification information (e.g., name, text, image sound, etc) associated with information providers that wish to provide authentication of an information provider to information recipients. An information provider refers to an entity that an information recipient communicates with to receive and/or access information. Examples of information providers include, but are not limited to, senders of e-mail messages, senders of IM messages, webpage owners and the like. Each information provider authentication application receives an authentication certificate associated with a data communication originated by an interested party and use the authentication certificate to facilitated authentication of identification information of the interested party. A notification is conveyed to the information recipient(s) indicating whether the identification information has or has not been successfully authenticated.

Figure 1:
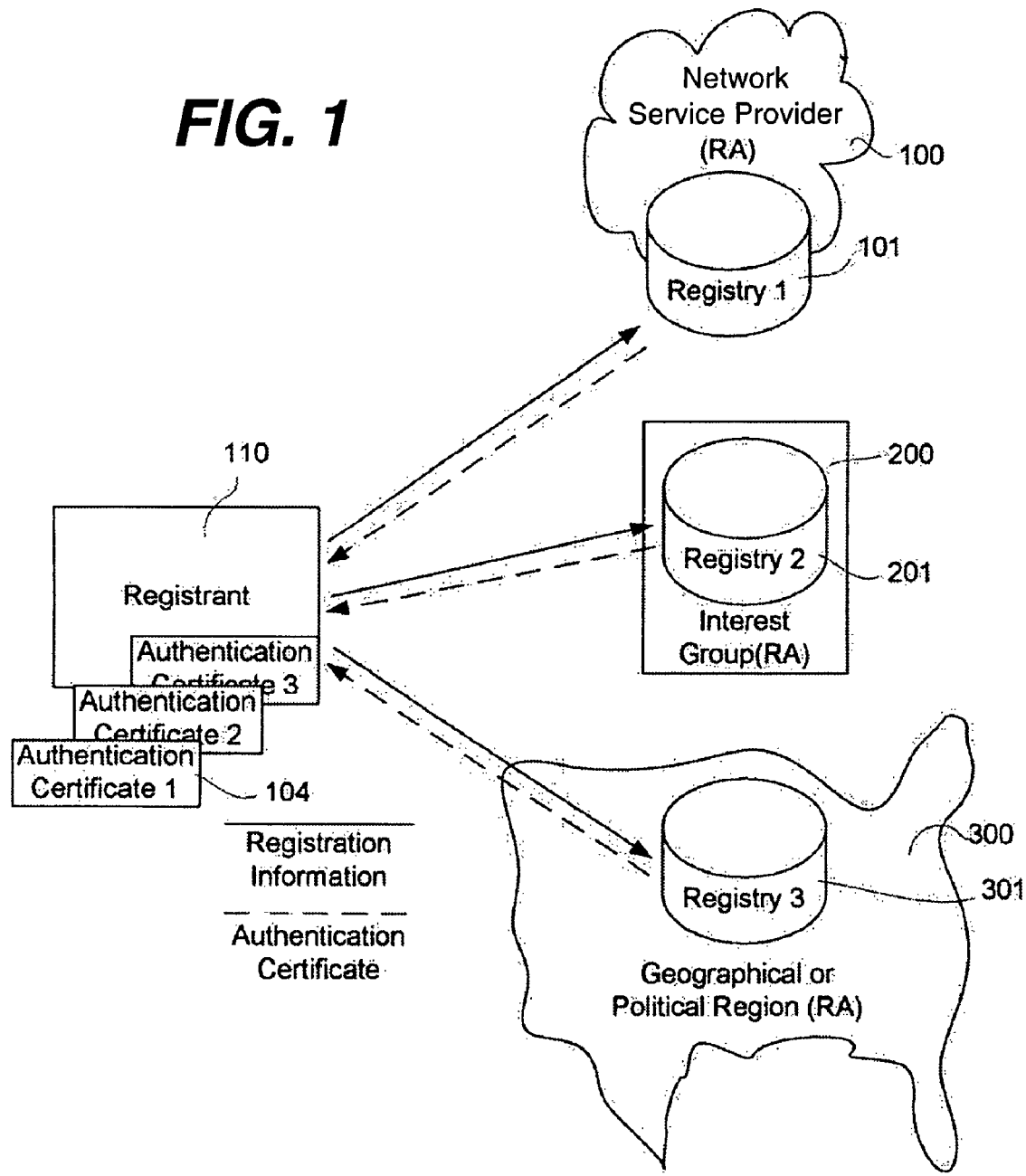
FIG. 1 is a schematic diagram of a registration infrastructure and process for information provider registration in accordance with the present invention.

FIG. 1 is a schematic diagram of an exemplary registration infrastructure and a process for registration of identification information in accordance with the present invention. In this example, a registrant 110 registers with three separate registries: registry 101 is operated by a registration authority (RA) that is a network service provider 100, registry 201 is operated by a RA that is an interest group (such as a trade association), and registry 301 is operated by a RA that is a geographical or political region (perhaps a government or other official entity). Registrant 110 registers in this manner to provide authenticated identification information to information recipients that subscribe to any one of the available registries. That is, registrant 110 can be authenticated to an information recipient if and only if the information recipient subscribes to one or more of the available registries, in this example, registries 101, 201 or 301.

Each registry is operated by the respective RA. Operating a registry is defined herein to include maintaining information contained in a registry. A RA may be any public or private organization interested in providing an identification information registry. A RA does not require approval from any authority to operate, but may seek endorsement by these authorities. End-users, service suppliers, and/or equipment suppliers can determine if any given registry is trustworthy, and subscribe to only those registries determined to be trustworthy. Each registry is composed of two main parts—the RA (Certification Authority in X.509 parlance) and a database of identification information. Each registry serves a predetermined subscriber group, region and/or a predefined interest group. A region served by one registry may overlap a region served by another registry, and two or more registries may serve the same region. Similarly, two or more different defined interest groups can overlap (e.g., doctors and the more narrowly defined interest group of pediatricians).

The registry 101 is maintained by a network service provider 100 that wishes to provide an authenticated information provider service to any company, public or government organization, or other registrant 110 who wishes to provide authenticated identification information to information recipients served by the network service provider 100. The registry 201 is operated by the interest group 200 such as, for example, the Canadian Bankers Association®, which maintains the registry 201 to provide authenticated identification information and/or associated services to its bank members. The registry 301 is associated with a geographical or political region such as, for example, New York State; the Province of Ontario; the City of Toronto; the greater Chicago area; etc. and is maintained by a corresponding government agency or other official entity 300.

In one embodiment, the only responsibility borne by the RAs 100, 200 or 300 is to ensure proof of identity of any registrant 110 and to ensure that it does not register any duplicate identification information for different registrants 110. In this embodiment, the registry 101 (which consists of the database and the RA) can be freely inspected by the public and it is at least partially the responsibility of registrants 110 and other interested parties to police the registries 101, 201 and 301 in order to ensure that a confusingly similar or misleading information provider identity is not registered by another registrant 110. When a registrant 110 is registered, the RA issues an authentication certificate 104. The authentication certificate certifies that the registered information provider identity (i.e., identification information) is bound to a public key of the registrant, which is in turn implicitly paired with a private key of the registrant.

Registration Process

The authentication certificate 104 provided to each registrant 110 by a registry can conform to any known authentication system, and each registry can use a different authentication system without departing from the scope of the present invention. When the registrant's identification information is recorded in a registry, an authentication certificate is provided to the registrant 110 to permit information provider authentication to be performed. The authentication certificate can be based on any public key infrastructure scheme like X.509.

If X.509 certificates are used for the authentication certificates provided to the registrants 110, in one embodiment of the present invention, the registration process proceeds as follows (i.e., using RA 100 as an example).

1) The RA 100 publishes its public key in its root certificate. The root certificate is a certificate that has the public key of the Registry (i.e., Certification) Authority. This public key is used to verify authentication certificates, so the root certificate must be imported into each device that will perform the information provider authentication. Typically, it is assumed a vendor or owner of data communication equipment will pre-load the root certificates of interest—including any local regional registries, all popular trade and professional registries, etc. in much the same way that Web browsers are preloaded with PKI root certificates today. Optionally, there is a way for allowing the end user to import more root certificates in the cases where the end user does business in multiple regions or is interested in a specialized registry. As understood by those skilled in the art, there is no limit to how many root public keys can be imported or the means for allowing such import.

2) Each interested party (i.e., registry applicant) wishing to become a registrant 110, generates its own public/private key pair, submits the public key to the RA 100 along with its identification information and any other required registration information and/or documentation.

3) If the RA 100 determines that the interested party in fact owns or is otherwise in lawful possession of the identification information, the RA 100 enters the identification information into the database 100 and uses the private key of RA 100 to sign an authentication certificate that includes the registrant's identification information and the registrant's public key. The RA 100 therefore "vouches" that the registrant's public key is "the" public key that is bound to the registrant's identification information, and that the registrant is entitled to use that identification information.

4) The registrant 110 now has a signed authentication certificate that attests to its identification information, and the registrant 110 also has the private key that permits the registrant 110 to validate that authentication certificate. It should be understood that the meaning of the authentication certificate is limited. The authentication certificate only signifies that the holder of the private key (which should be registrant 110) is entitled to have its identification information displayed in the jurisdiction of the particular registration authority 100 with which the registrant 110 has registered.

Information Provider Authentication

Figure 2:
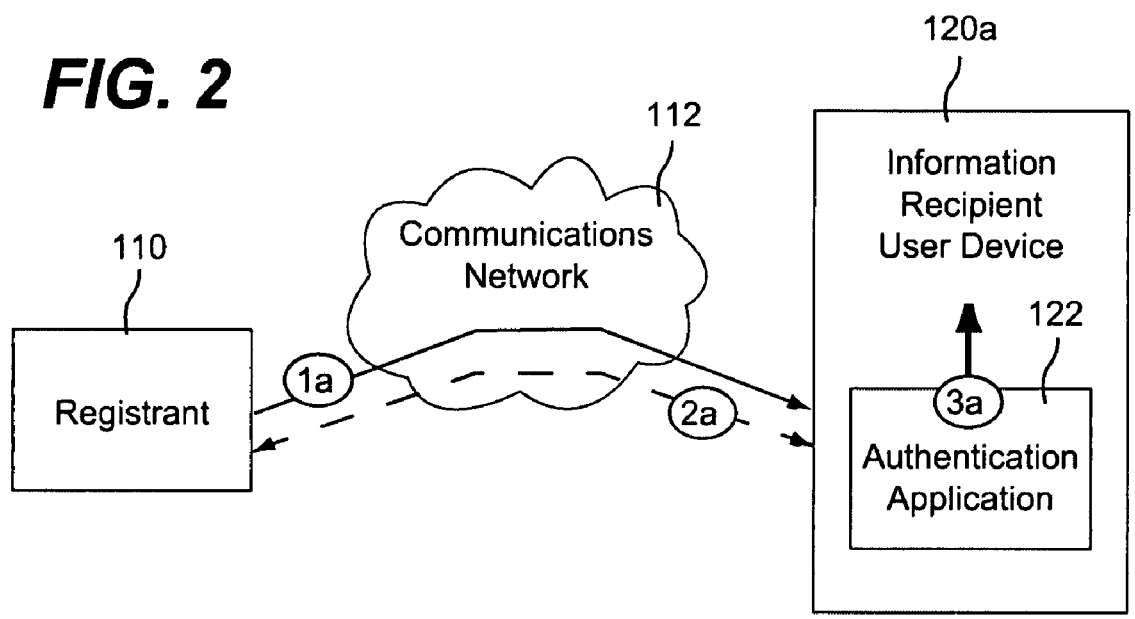
FIG. 2 is a schematic diagram of an information identity authentication infrastructure and process performed by a user device executing an identification information authentication application in accordance with the present invention.

FIG. 2 shows an embodiment of an information provider authentication arrangement in accordance with the present invention. An information recipient user device (i.e., the device 120a) performs the information provider authentication. Examples of the device 120a include, but are not limited to, a device such as personal computer or an Internet Protocol (IP) telephone that is configured for communicating via e-mail messages, communicating via Instant Messaging and/or for accessing webpages. The device 120a is equipped with an information provider authentication application 122, which provides for a very secure form of information provider authentication in accordance with the present invention. This security stems from the information recipient having direct control/oversight of the authentication application 122, meaning that the information recipient only needs to trust its own device. In other embodiments, depending on the service (web/email/IM), it is possible to perform the authentication in a proxy. But, such an arrangement opens up many avenues of attack and makes it much more difficult to make secure. Accordingly, it can be seen that the device 120a being equipped with the information provider authentication application 122 advantageously provides for identification information authentication to be implemented in an "end-to-end" manner.

Still referring to FIG. 2, when the registrant 110 initiates transmission of offered information for reception by the device 120a, such information transmission (1a) proceeds through the data communication network(s) in a manner well known in the art. Examples of such information transmission include, but are not limited to, transmitting an e-mail message, transmitting an IM message, transmitting website content, transmitting a webpage, and other forms of transmitting information via a data communication or telecommunication network. In conjunction with transmitting the offered information, an information provider authentication interaction (2a) is initiated for causing registrant device 110 to send its authentication certificate for reception by the device 120a. In the case of the information being a web page, the interaction is dialog between the devices. In the cases of an e-mail or an IM message, the interaction includes the transmission of information, but may not be dialogue between the two devices as one or both end-point devices in an e-mail system or IM system may be offline. The offered information and the authentication certificate can be transmitted using the same or different ones of known communications protocol that are suitably configured for communicating data over a data network or communications network. In response to receiving the authentication certificate, the information provider authentication application 122 conducts the authentication interaction with the registrant device 110 and verifies authenticity of the authentication certificate obtained during the authentication interaction. It should be understood that information provider authentication does not require a query of the registries 101, 201, 301. It is disclosed herein that the registrant device 110 can be the same equipment used for facilitating transmission of the offered information or different equipment (e.g., the same server or a different server). Once determined, the result of the authentication process is then conveyed (3a) to the device 120a, as will be explained below with reference to FIGS. 3a-3c and 4a-4d.

An authentication application in accordance with the present invention preferably, but not necessarily, resides on a user device. This means that a user needs to trust only its device as opposed to remote devices. Depending on the service (e.g., web, email, IM, etc), it is possible to perform authentication in a proxy. But, this opens up many avenues of attack and makes the authentication process much more difficult to make secure. Accordingly, the "end-to-end" approach to authentication as disclosed herein is advantageous.

Figure 3A:
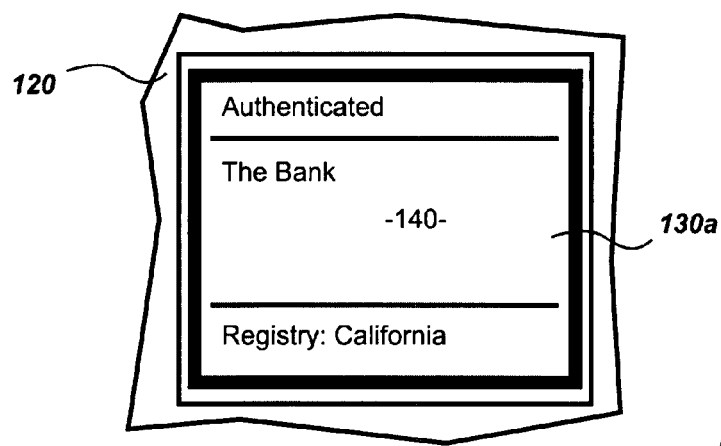
FIGS. 3a-3c are schematic diagrams of an information recipient device displaying identification information authentication messages in accordance with the present invention.
Figure 3B:
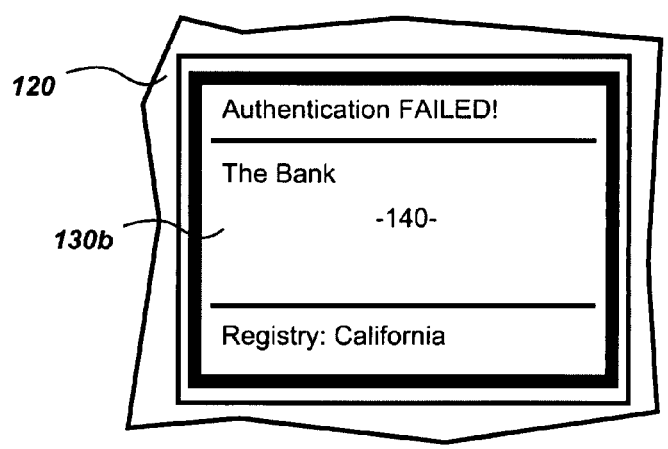
Figure 3C:
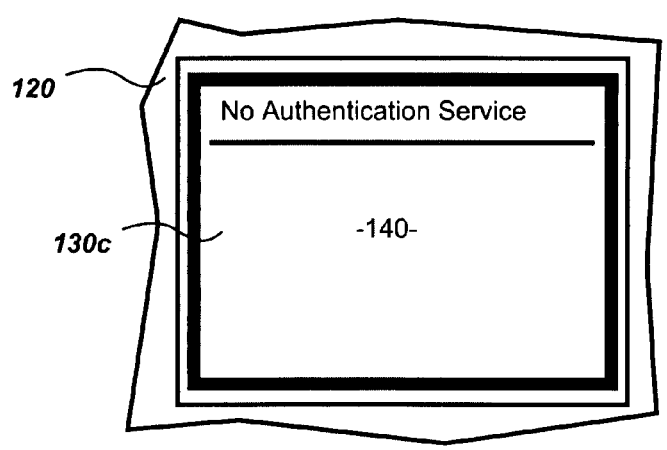

FIGS. 3a-3c show examples of information provider authentication messages conveyed to information recipients in accordance with one embodiment of the present invention. In these examples, the information provider authentication messages that are displayed include information indicating whether the identification information has been successfully authenticated, information indicating the identification information (optionally the logo, etc.), and information designating which one of the registries 101, 201, 301 with which the information provider has registered.

FIG. 3a shows an exemplary display format 130a for identification information that has been successfully authenticated. A first line of the display format 130a indicates that the identification information has been successfully authenticated. The display format 130 is provided on a visual display 140 of the device 120. As depicted, the display format 130a encompasses a significant area of the visual display 140. However, in other embodiments (not shown), the display format 130a encompasses a limited area of the visual display 140. A second line of the display 130a displays the authenticated identification information. The last line of the display displays the name of the RA, in this example a registry associated with the State of California.

FIG. 3b shows an exemplary display format 130b for an information provider that could not be authenticated because authentication failed. As understood by those skilled in the art, information provider authentication may fail for any one of a number of reasons. For example, the information provider may present a stolen authentication certificate for which the information provider does not have the corresponding private key, the authentication certificate is from a registry that is not known to the user device, the authentication certificate cannot be validated with the public key of the CA, a communications failure may have occurred, an authentication interaction may have been interrupted, etc. A first line of the display 130b indicates that the information provider has not been successfully authenticated because information provider authentication has failed. A second line of the display 130b displays the identification information contained in the authentication certificate, if available. The last line of the display 130c displays the name of the registry contained in the authentication. certificate, if available. To further highlight the fact that authentication failed, the message can be displayed in a bright color, red for example, etc.

FIG. 3c shows an exemplary display format 130c for an information provider that could not be authenticated because the information provider does not present an authentication certificate. The first line of the display 130c indicates that the information provider has not attempted authentication and the rest of the lines may be blank, as shown, or may display a identification information, in which case the fact that authentication was not attempted should be emphasized by highlighting or blinking the no authentication service message.

As will be understood by those skilled in the art, the display formats 130a-130c may not always be practical or desired by an information recipient. For example, in the case of a personal computer, size of the visual display will typically not be a limiting factor with respect to visual presentation of the authentication results. However, size of a visual display of a handheld device such as a cellular telephone, personal digital assistant, handheld computer, etc may be a limiting factor in visual display of the authentication results. It is, therefore, contemplated that other forms of indicating authentication process results can be used for conveying such results. FIGS. 4a-4d illustrate alternate forms of indicating authentication process results for conveying such results to an information recipient. Although the examples shown in FIGS. 4a-4d illustrate a specific type of device 140 (i.e., a cellular telephone), it should be understood that such other forms of indicating authentication process results can be conveyed to most known types of data communication devices.

Figure 4A:
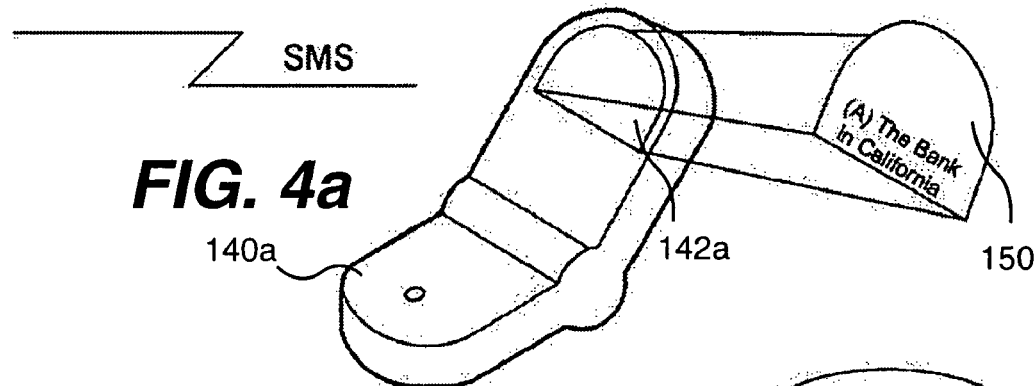
FIGS. 4a-4d are schematic diagrams of different methods of conveying caller authentication indications to information recipient devices.

As shown in FIG. 4a, in one embodiment, an information provider authentication or authentication failure can be conveyed via an information recipient device using an out-of-band message outputted concurrently with or after a message receipt notification signal is outputted from the device 140a. In one embodiment, a visual message is outputted on a visual display 142a of the device 140a. In another embodiment, a Short Message Service (SMS) message is sent to the device 140a from a server that performs the authentication process and that SMS message is visually displayed on the visual display 142a. The visual message displayed includes an indication 150 that the information provider has been authenticated (A), shown in FIG. 4a, or not authenticated (NA), which is not shown, and the information provider ID (e.g., "The Bank in California").

Figure 4B:
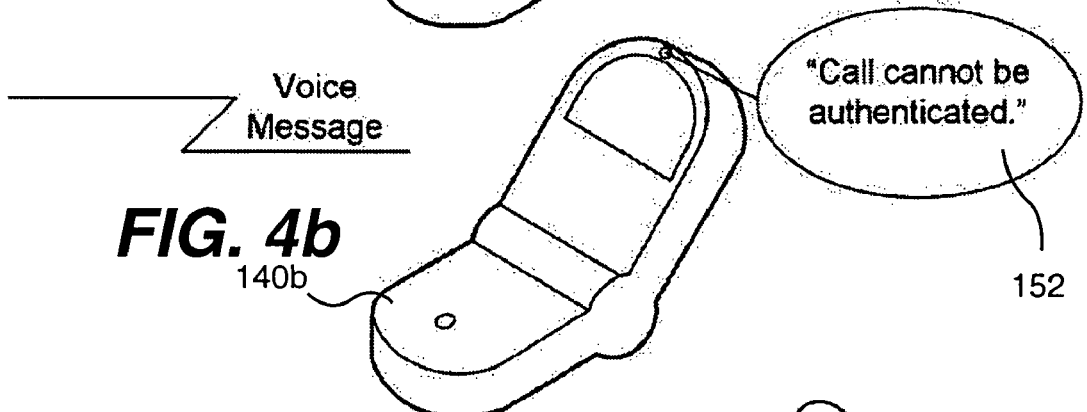

As shown in FIG. 4b, in another embodiment, an in-band audible message can be outputted via an audible output means of the device 140b when the information recipient accesses corresponding offered information. The audible message indicates whether the information provider was or was not successfully authenticated. The audible message can be outputted after the information recipient performs such accessing, but before the offered information is presented, so that the information provider cannot forge the audible message. In this embodiment, the information recipient receives an audible message 152 indicating that the information provider could or could not be authenticated.

Figure 4C:
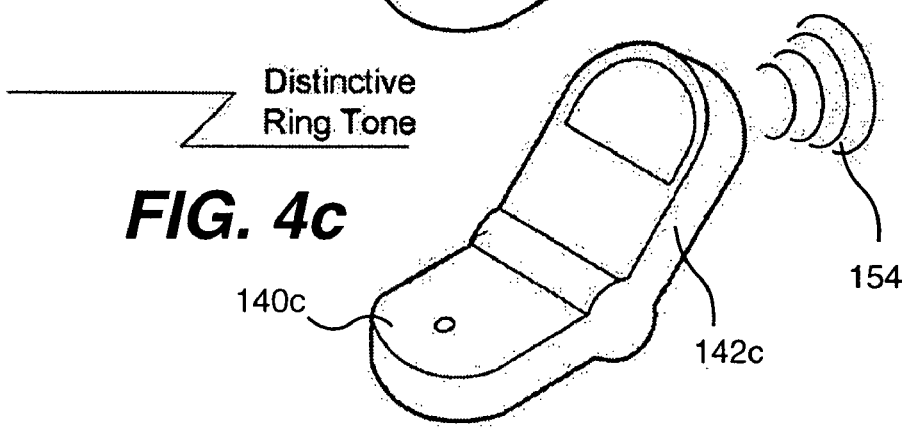

As shown in FIG. 4c, in another embodiment, a distinctive ring tone is outputted by an audible output means of the device 140c. One ring tone 154 indicates an authenticated information provider and another ring tone (not shown) indicates identification information could not be authenticated.

Figure 4D:
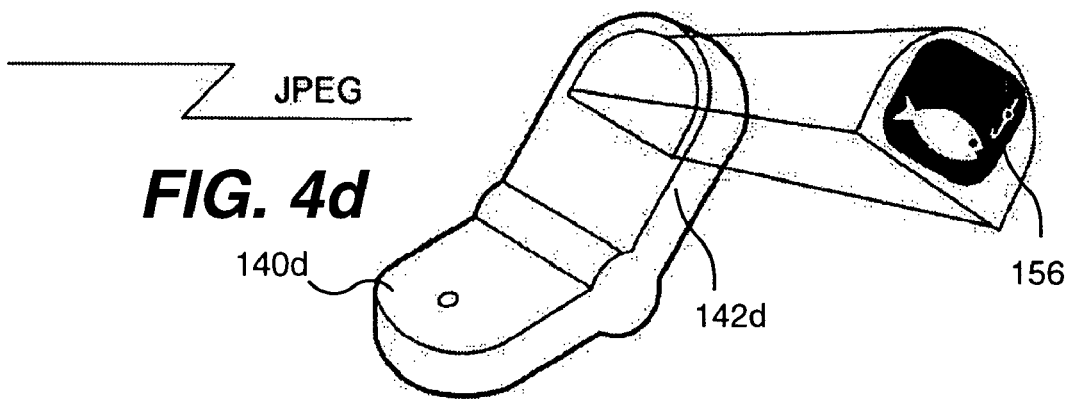

As shown in FIG. 4d, in yet another embodiment, an image 156 (e.g., a jpeg image) is sent to the device 140d to indicate whether identification information has been authenticated. In this embodiment, the image 156 indicates that the identification information could not be authenticated by means of being an image that depicts a fraudulent/malicious activity (e.g., phishing) corresponding to the failed authentication. Another image (not shown) is used to indicate the situation in which identification information is successfully authenticated.

Presented now is disclosure of facilitating authentication in accordance with the present invention, as applied to a variety of specific types of communication mediums. Examples of these communication mediums include, but are not limited to e-mail, IM messages and webpages. Following are embodiments of specific approaches for independently facilitating message authentication in the context of e-mail, IM messages and webpages. A skilled person will appreciate that fraudulent and malicious activities are often perpetrated through combinations of communications mediums. For example, phishing activities often 'present the bait' through an e-mail message having falsified or confusing sender information and 'set the hook' through a webpage that falsely purports to be that of a credible entity. Setting the hook often includes obtaining highly confidential information such as, for example, bank account information, thus allowing unauthorized withdrawal of funds from an account. Accordingly, it is disclosed herein that the approaches for facilitating message authentication in accordance with the present invention and in the context of different communications mediums can advantageously be practiced independently or in combination for the purpose of combating fraudulent and/or malicious activities such as, for example, phishing over VoIP, business-to-business authentication, Spam filtering, email forgery, web page forgery, web page phishing, IM session hacking and the like.

E-Mail Authentication

SMTP (Simple Mail Transfer Protocol, RFC 2821) is presently the overwhelmingly dominant email protocol. Accordingly, e-mail message authentication will be discussed herein in terms of SMTP. But, as a skilled person will appreciate, embodiments of the present invention specifically configured for facilitating e-mail message authentication can configured in accordance with most, if not any, e-mail messaging protocol.

In accordance with the present invention, facilitating e-mail message authentication includes the message sender (i.e., information provider) having to sign an e-mail using an authentication certificate. More properly, the message sender signs the e-mail message using the private key that corresponds to the public key embedded in the authentication certificate. In view of the e-mail message being signed with the private key, a recipient of this signed e-mail message is able to use the public key to authenticate identification information contained in the e-mail message.

SMTP has many unique functionality considerations that make authentication of content contained within a message transmitted using SMTP challenging to facilitate. One such consideration is that e-mail is a store-and-forward system. There is a minimum of two MTA (Mail Transfer Agent) between a sender and a recipient of an e-mail message, with each MTA running a different version of a different program. A MTA is basically a mail server running a sendmail or a postfix application. It is not unusual for there to be half a dozen or more MTAs between a sender and a recipient of an e-mail message. SMTP only allows interaction between the pairs of MTAs on each hop. The sender and the recipient might not ever be online at the same time, which rules out any interaction if there is a preference for end-to-end authentication.

Each email in accordance with an e-mail messaging protocol such as, for example, SMTP has a number of "header" lines. There are many headers specified in the standards for SMTP, MIME, etc. There are also extension headers that anyone can put in for any reason. For example, X-Scanned-By is a popular header added by malicious software scanners, X-Mailer is another header to indicate which software was the sender MUA. A skilled person will appreciate that the presence of such a header does not guarantee that the email message containing it is clean. For example, the header could have been added by an entity for malicious purposes or by an entity with an old version of a scanner. We are proposing that two additional headers: X-RealName-Certificate and X-RealName-Checksum to contain the certificate and signed checksum, respectively. It is also possible to combine them into a single header.

Each MTA is supposed to insert new header lines and to rewrite some header lines. This means the checksum cannot naively just be over the email as sent originally. Worse, the e-mail message body may be modified for a number of reasons. One example of such modification is altering "From" at the start of line to ">From". Another example is that some MTAs and some MUAs (e.g., a Mail User Agent that is essential a user programs like Microsoft Outlook™) will improperly split messages for line length and other reasons.

MIME (Multipurpose Internet Mail Extensions) is an extension to SMTP that, amongst other things, defines multi-part messages that can include "parallel" and/or "alternative" views. Different MUA have different rules for which part of a message to display. Some Spam e-mail messages are intentionally sent with a body with multiple parts: one part in ASCII and one part in HTML. The intention is for a Spam filter to filter based on the ASCII part and for the e-mail program (i.e., MUA) to display the HTML part.

Figure 5:
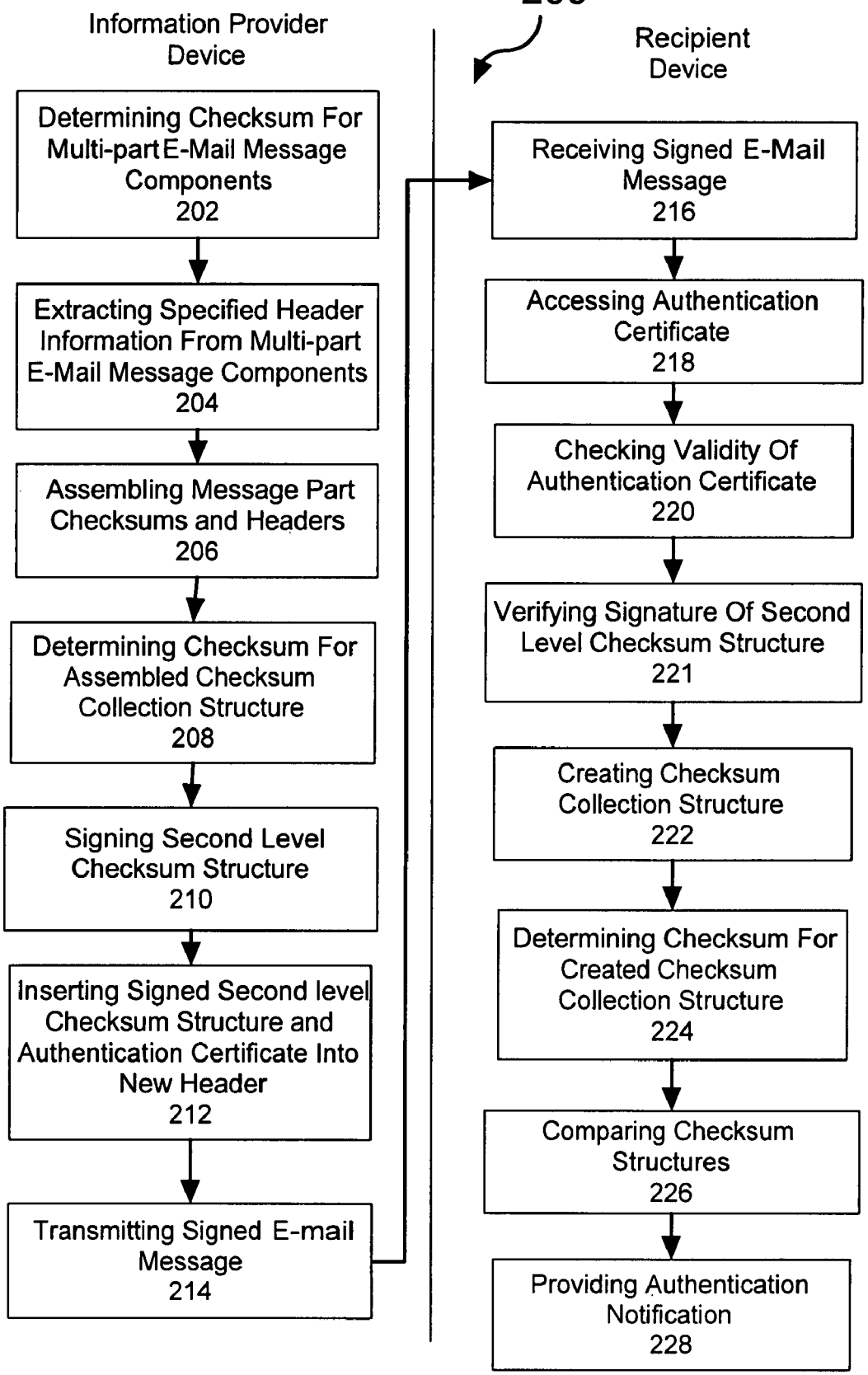
FIG. 5 is a flow chart showing an embodiment of an e-mail message authentication methodology in accordance with the present invention.

Accordingly, embodiments of the present invention that are configured for facilitating e-mail message authentication must address these unique functionality considerations while still performing robust e-mail message authentication that is resistant to forgery tactics such as, for example, replay and man-in-the-middle attacks. To this end, in one embodiment of the present invention, an e-mail message authentication methodology 200 shown in FIG. 5 is implemented jointly by an e-mail enabled information provider device and an e-mail enabled information recipient device.

1. Referring to FIG. 5, a Checksum operation 202 is performed on each part of a multi-part e-mail message (i.e., original e-mail message). The checksum operation produces a checksum (i.e., computed value) that is dependent upon the all or a portion of the e-mail message content. The Checksum operation preferably includes applying a cryptographically strong hash such as, for example, SHA-1 (Secure Hash Algorithm-1). Parts of the message that are non-text are encoded in a suitable manner allowing the Checksum operation to be performed on these non-text parts in their encoded form.

To checksum textual parts of the original e-mail message, including the body of single-part emails, and parts that are "text" (including HTML and other), there is some processing that is preferably performed. This processing is referred to herein as 'normalizing'. The object of normalizing is to produce a message body part that is invariant under all the modification done by the mail programs, but that still retains all the text that is visible in the message as viewed. Such mail programs are applications such as, for example, Microsoft™ Outlook™ that are used for creating, sending and receiving e-mail messages. Normalizing entails additional processing, but can beneficially simplify the logic of the authentication application.

In one embodiment, normalizing preferably includes stripping out all white spaces such as blanks, tabs, backspace, line-end characters. Note that different operating systems have different line-end conventions, so we treat all <cr> and <linefeed> as white space. Any ">" characters at the start of a line are also stripped. Another approach is to compress each contiguous sequence of white space into a single blank, improving human readability at minimal cost. Furthermore, it is not necessary for the e-mail message body to be in ASCII. Emails in other character encodings (e.g., EBCDIC), or even arbitrary binary files can be normalized as if they are in ASCII. Alternatively, encoded parts of the original e-mail message (e.g., image portions) can be subjected to normalizing, as needed and appropriate.

2. A header extraction operation 204 is performed for extracting specified header information from the original e-mail message. Examples of such extracted header information include, but are not limited to, "from:" and "reply-to:" addresses, "message-ID:". It should be noted that, in cases where an e-mail messages does not have all categories of such extracted header information, a single blank or other suitable representation can be used for denoting missing ones. The date specified in the "Date:" header is another example of specified header information that should be extracted. Because the date may be in any time zone, it is useful to standardize it to a prescribed time zone such as, for example, UCT or a local time.

3. After any necessary checksumming (with or without normalizing) and extraction is performed on the various parts of the original e-mail message, an operation 206 is performed for assembling all the checksums and headers (i.e., a checksum collection) into a single structure. This single structure is defined herein to be an assembled checksum collection structure. One embodiment of the assembled checksum collection structure is a content field string having the following format: "from: <thefromaddress>, reply-to: <thereplyaddress>, date: <date>, body: <bodychecksum>, part 1: <part1checksum>, etc." It should be noted that for MIME multi-part handling, the naming and ordering of parts can become tricky because some parts will have multiple names (a name in the "Content-Type:", a name in the "Content-Displosition:") and other parts may have no name. Optionally, the message-id can also be included in this structure. In this manner, all of the normally visible part of a multi-part e-mail message as well the date and sender addresses are included (directly or indirectly via checksums) in the checksum collection. This means the signature cannot be reused for other bodies and, in fact, prevents replay attacks.

4. In response to creating the assembled checksum collection structure, an operation 208 is performed for determining a checksum for assembled checksum collection structure, thus producing a second level checksum structure (i.e., a checksum of the checksum collection structure).

5. After determining the second level checksum structure, an operation 210 is performed for signing the second level checksum structure with a private key corresponding to an authentication certificate of the information provider, thus producing a signed checksum. This second level checksum structure provides for optimization to minimize bandwidth. The checksum collection is probably on the order of, for example, several hundred bytes. The second level checksum structure is of the order of, for example, 20 bytes. By sending the second level checksum structure, the checksum collection does not need to be transmitted, thereby reducing bandwidth utilization. RSA public key signatures are relatively slow to begin with and, the longer the message, the slower the signature. The checksum collection is long enough that it would be faster to compute a checksum and sign just the checksum.

6. After producing the signed second level checksum structure, an operation 212 is performed for inserting the signed second level checksum structure and corresponding authentication certificate into a new header of the original e-mail message, thereby creating a signed e-mail message (i.e., a message signed by a authentication certificate in accordance with the present invention). The original pieces of the e-mail are not changed, the signed checksum and authentication certificate are inserted as additional header lines for the purpose of authentication. If the recipient does not care to authenticate, the recipient device just ignores the additional headers.

7. An operation 214 is performed for transmitting the signed e-mail message from the information provider device for reception by the information recipient device and correspondingly, an operation 216 is performed by the information recipient device for receiving the signed e-mail message.
8. At the receiver end where a recipient has received the signed e-mail message, an operation 218 is performed for accessing (e.g., extracting) the authentication certificate and signed second level checksum structure.
9. In response to accessing the authentication certificate, an operation 220 is performed for verifying validity of the authentication certificate. Preferably, such validity is checked in accordance with X.509 PKI. More specifically, such verifying includes confirming that the recipient has the root certificate of the registry, confirming the authentication certificate is properly signed by the registry, checking valid interval to be sure that certificate has not expired and checking revocation list to be sure that the certificate has not been revoked.
10. After the certificate is verified, an operation 221 is performed for verifying that the signed second level checksum structure has been correctly signed by the private key corresponding to the authentication certificate.
11. In conjunction with (e.g., in response to) successfully verifying validity of the authentication certificate and the signature of the second level checksum structure, an operation 222 is performed for re-creating the assembled checksum collection structure from the e-mail message.
12. After recreating the assembled checksum collection structure, an operation 224 is performed for determining the second level checksum structure from the re-created assembled checksum collection structure. This entails performing the same functionality as that of operations 202-208.
13. An operation 226 is then performed comparing checksum retrieved from the headers against checksum for the re-created assembled checksum collection structure. If the checksum for the re-created checksum collection structure agrees with the retrieved checksum (i.e., signed checksum), the e-mail is assumed to be authentic. Because the signature is verified against the authentication certificate and is checked by the recipient, the concern of man-in-the-middle attacks is greatly diminished, if not eliminated.
14. In response to verifying the signature of the assembled checksum collection structure (e.g., via identification information contained within the authentication certificate), an operation 228 is performed for providing authentication notification indicating whether or not the signature was successfully verified.

On the surface, this e-mail message authentication methodology may seem somewhat complicated. But, it can be accomplished at minimal processing time by carrying out multiple checksum operations in parallel with the copying of the email body that are typically done by the MUA/MTA when sending and receiving mail. Furthermore, modem e-mail servers typically do virus scanning and, in comparison, this e-mail message authentication methodology is relatively simple.

In summary, e-mail message authentication in accordance with the present invention includes sender functionality, MTA functionality and recipient functionality. The sender functionality includes calculating a checksum for content of an original e-mail message, assembling the checksums and e-mail message content into a single structure for producing a checksum collection structure; calculating a checksum for the assembled checksum collection structure (i.e., the second level checksum structure), signing the second level checksum with a private key that corresponds to an authentication certificate, putting the signed second level checksum structure into a respective header (e.g., x-RealName-checksum) and putting the authentication certificate into a respective header (e.g., x-RealName-certificate). The MTA functionality includes each MTA needing to leave the headers alone, which is the default functionality for most MTA software. The recipient functionality includes extracting the authentication certificate and signed second level checksum structure from the respective headers, checking that the certificate is valid (i.e., correctly signed by CA, not expired, not revoked), using public key in certificate to check that the signed second-level checksum is correctly signed, calculating own version of checksum for the checksum collection structure and comparing the two versions of checksum. It should be noted that the signed second level checksum structure appears in plain text, which is acceptable because a cryptographically strong hash function (e.g., SHA-1) means there is no viable way to find another string that will hash to the given checksum collection structure. This authentication methodology has the advantages of no MTA software changes (i.e., easy to deploy), and end-to-end deployment, relies only on registration for security and works with MTA/MUA that don't follow strict standards.

In one alternative implementation, a level of checksum is saved at the cost of bulkier header lines being transmitted. The alternative is to directly sign the checksum collection structure (e.g., using the private key corresponding to the authentication certificate) as opposed to signing the second level checksum structure for it. In such an alternate embodiment, the information recipient device will decrypt the checksum collection structure (e.g., using the public key in the authentication certificate) as opposed to confirming its checksum. Thus, it is disclosed herein that embodiments of an encoded checksum collection structure include, but are not limited to, an assembled checksum collection structure that has been signed by a private key corresponding to an authentication certificate and an assembled checksum collection structure that has been encrypted.

In another alternate implementation, signing of the second level checksum structure is omitted and the assembled checksum collection structure is signed.

In another alternative implementation, the authentication certificate is not directly provided in the email header lines but is indirectly accessed. Because the authentication certificates can be bulky and each sender/recipient device pair will likely send multiple emails over time, it is advantageous to avoid sending the same bulky certificate many times as well as avoiding the requisite validations. This can be done by insert a pointer to the certificate (e.g., an URL) instead of the complete certificate. The recipient device can then fetch the designated authentication certificate and cache it for later use. Thus, an authentication certificate and means such as a pointer that allows an authentication certificate to be accessed from a particular source are both examples of authentication certificate information in accordance with the present invention. It should also be appreciated that this "indirect" approach to designating the requisite authentication certificate is also useful for webpage authentication in accordance with the present invention.

In still another alternative implementation, the checksum structure (either the second level checksum structure or the assembled checksum collection structure) is encrypted rather than signed. In such an implementation, the encrypted checksums are inserted in the header and the recipient must decrypt the encrypted checksum as opposed to checking the signature. As opposed to the plain text of the message remaining visible even after the operation of signing, the plain text of a message becomes unreadable after the operation of encryption. It is disclosed herein that signing and encrypting are examples of encoding for the purpose of proving that an entity has a private key corresponding to a certificate, thus proving their identity. Verifying validity of a signature and decrypting are examples of decoding such encoded information and, when performed by an authorized party, provides for secure communication of encoded information. Accordingly, it is disclosed herein that operations and associated functionality herein performed for signing and verifying a signature can be replaced with operations and associated functionality for encrypting and decrypting, respectively.

Still referring to encrypting and decrypting checksums, only a sign operation or an encrypt operation needs to be performed on the second level checksum structure. Either operation will proof that the sender sent the e-mail message containing the checksum. Basically, a first operation is performed for the information provider device to compute a checksum. The checksum can be the checksum collection or the second level checksum structure. As disclosed herein, implementation of the second level checksum structure saves CPU cycles as well as required bandwidth. Encoding the assembled checksum collection structure or the second level checksum structure will identify the message. But, an operation must still be performed for proving that the message is from the designated information provider. Accordingly, a second operation is performed for providing such proof by signing or encrypting the checksum. If the proof is by signing, then a respective signature is sent to the information recipient device. If the proof is by encryption, then a respective cyphertext is sent to the information recipient device. For a signed or encrypted checksum, the information recipient device goes through the same operations of re-creating the checksum whether it is the assembled checksum collection or the second level checksum structure. If the supplied proof is the cyphertext, the information recipient device decrypts the checksum and compares it against the re-created checksum. If the supplied proof is a signature, the information recipient device checks the signature. Each sender can, independently, chose to use any of the four possible combinations of the first and second operations.

Webpage Authentication

For webpage authentication, various aspects of HTTP/HTML (HyperText Transport Protocol/Hypertext Markup Language) must be dealt with in order to effectively implement message authentication in accordance with the present invention. One aspect that must be dealt with is that a webpage is not just a single HTML file. Most web pages are composed of many different pieces, for example, images, frames (each specified by a HTML file), javascript, which will each have a different URL.

Another aspect that must be dealt with is that verifying X.509 certificates is a fairly costly operation from a processing resource standpoint. Many web servers already off-load the operation to dedicated hardware and any added workload is preferably minimized. Another aspect that must be dealt with is that the pieces of a single webpage will frequently come from different servers. For example, many websites have content components that are provided and controlled by a third-party website entity (e.g., advertising provider). Another aspect that must be dealt with is that many web servers handle multiple domains. For example, it is common for multiple domains of a given entity (e.g., www.x-company.com, www.x-company.org, www.x-company.tv, etc) to all be served from a single server. In theory, the server setup should separate the multiple domains. But, a single server serving all of these domains often treats them all as the same address (e.g., www.x-company.com). One significantly adverse consequence of this, which must be addressed to offer effective authentication functionality, is that many web sites end up using the wrong SSL certificate because each SSL certificate specifies a corresponding domain. Another aspect that must be dealt with is that, for reliability, most major web sites need some sort of load balancing and replication. This means that multiple machines (i.e., of possibly different OS and Web server versions) can answer to the same URL. In the extreme cases, different pieces of a single page or even just the pieces within a single domain could come from different servers in the load balance set, which complicates authentication practices. Another aspect that must be dealt with is that many webpages are not static, but are generated dynamically. These dynamic pages are sometimes generated by complex systems and it would be undesirable to force webpage to be modified to have special tags, etc. Still another aspect that must be dealt with is that, because SSL operates below HTTP and has no knowledge of the higher-level protocol, SSL servers can only present one authentication certificate for a particular IP/port combination. This means that in most cases it is currently not feasible to use name-based virtual hosting with HTTPS.

Figure 6:
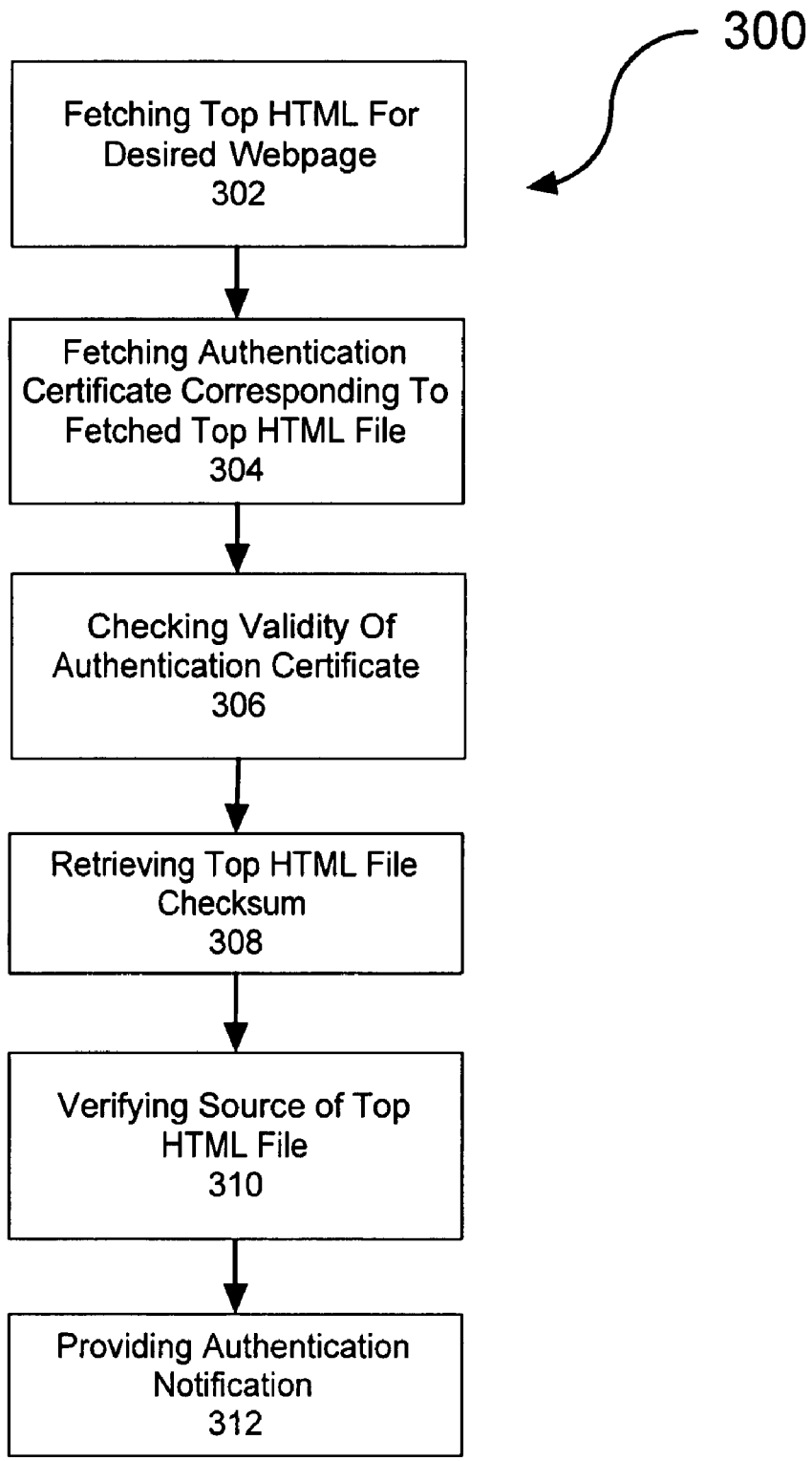
FIG. 6 is a flow chart showing an embodiment of a HTTP page (e.g., web page) authentication methodology in accordance with the present invention.

In one embodiment of the present invention, these unique functionality considerations are dealt with by ignoring SSL/TLS and operating at the HTTP level. Advantageously, this approach allows HTTPS to use SSL/TLS for confidential information. In this respect, the underlying functionality of the present invention does not adversely impact existing security provisions. A webpage will refer to an authentication certificate that is checked by the browser and then displayed in a separate unforgable area of the browser. To this end, in one embodiment of the present invention, a browser of an information recipient user device performs the webpage authentication methodology 300 shown in FIG. 6.

Recall that URL (Universal Resource Locator) is commonly used as a synonym for URI (Universal Resource Identifier), the exactly differences does not concern us here. Ignoring many complexities like username, password, port number; a simple URI looks like "http://www.xxx.com/demo/page.html" and is made up of three parts:

1. the protocol, in this case, "HTTP". Several dozens of protocols are supported; including FTP, telnet, gopher, and of course HTTP and HTTPS. We leave the handling of this to the browser, we merely expect the browser to know how to retrieve the specified resource.
2. the host, in this case, "www.xxx.com" that is the DNS name of the web server.
3. the path, in this case, "demo/page.html" that specifies the resource wanted. The resource could a HTML file, a gif graphic image, or something else. The resource could also be static or dynamically generated. It is customary to refer to these returned resources as HTML files and so on.

Recall that HTTP (HyperText Transport Protocol) is the most popular protocol used by a browser to communicate with web servers. The browser will present a URL and a "method" to interact with a server; we will make reference to two of these methods: "GET" and "POST". Both get and post will retrieve a "resource" corresponding to the URL, the differences between get and post do not concern us here. Both get and post returns the type of the resource that is retrieved, for example, a HTML file is of type "text/html", a gif encoded graphic image is type "image/gif". (This HTTP type is independent of the filetype as indicated by the suffix of the filename or URL, reconciling the multiple indications of type is beyond our scope.) We are concerned mostly with three different types of resources: HTML files, RealName certificates, and checksums.

Also recall that HTML (HyperText Markup Language) is a "markup language" descended from SGML. It provides a means to describe the structure of text-based information in a document —by denoting certain text as headings, paragraphs, lists, and so on—and to supplement that text with interactive forms, embedded images, and other objects. HTML is written in the form of labels (known as tags), surrounded by less-than (<) and greater-than signs (>). For example, "<title> Introduction </title>" is an example of the "title" tag and marks the text "Introduction" as the title of the page. Note the closing tag "</title>" is just the opening tag with an added slash. A HTML file is just a nested set of tags that describes the structure of the page. We propose to add an extra tag <RealNameSerialNumber> that will be used to identify web pages (since the same URL may dynamically generate a different page each time). Note that it is desirable but not necessary to change the HTML standard since browsers ignore tags that are unknown to them; this means there is no harm for a web browser to always include the <RealNameSerialNumber> tag in HTML files—RealName capable browser will authenticate and non-capable browser will just ignore it. Also, when we refer to HTML, we include XHTML and other XML/SGML like markup languages that are capable of supporting additional tagging of information.

1. At the start of a web page, an operation 302 is performed for fetching a file from a web server using HTTP GET/PUT. The URL and the file are referred to herein as the "Top URL" and the "Top file", respectively. We are most interested in the case where the top file is a HTML file, we will refer to it at the "Top HTML file". (Here "top" refers to the fact that this HTML file controls the building up of the web page by causing many other HTML files to be fetched as part of this page). Web servers that support RealName will cause each Top HTML file to include a tag that designates a serial number and a certificate URL (these two items could be in a single tag or multiple tags). The serial number is used to identified that particular instance of that page and is not limited to a serially incrementing number; the most convenient form is for the serial number to also be in the form of a URL This serial number arrangement is done only for the top level HTML. Allowing authentication for lower level HTML is expensive in CPU and bandwidth as well as opens up opportunities for variations of cross-site scripting attacks.

2. In response to fetching the Top HTML file, an operation 304 is performed for fetching the designated authentication certificate using HTTP or any mechanism specified in the URL. It is disclosed herein that an operation for caching the authentication certificate after retrieving the authentication certificate, thereby precluding the need to subsequently retrieve the authentication certificate from a remote source.

3. After fetching the authentication certificate, an operation 306 is performed for validating the authentication certificate using a resident (i.e., pre-stored) root certificate of that registry.

4. In response to successfully validating the authentication certificate, an operation 308 is performed to retrieve the checksum for the Top HTML file. This is done by sending the serial number to the web server (in the preferred form, the serial number is already a URL that can be used to retrieve the checksum), receiving a corresponding private key-encoded checksum (e.g., private key-signed, private key encrypted, etc) from the web server, and decoding the checksum using the public key in the authentication certificate (e.g., public key-verification, public key decryption, etc). Providing that the private key used for encoding the checksum matches the public key in the authentication certificate, the private key-encoded checksum from the web server will be correctly decoded. If a different private key is used, either the decoding will fail or the decoded checksum will be wrong, thus failing authentication.

5. In response to successfully decrypting the checksum from the web server, an operation 310 is performed for verifying that the Top HTML file actually came from the web server by computing our checksum of the Top HTML file and comparing our checksum to that decrypted from the web server. If the checksums are equal, the identification information for the webpage has been successfully authenticated. If not, the authentication fails.

6. In response to determining whether or not webpage was determined to be authentic, an operation 312 is performed for presenting notification information that indicates whether or not the webpage (i.e., identification information thereof) was found to be authentic. In one embodiment, this notification information is presented in a separate area of the browser window than with the webpage content. Furthermore, in one embodiment, the authentication certificate can include an HTML file to control the display of that separate area.

The advantage of this webpage authentication methodology is that only top HTML files need to be changed. By assuming that the top HTML files are the only webpages considered "important" enough to need to have respective authentication certificates potentially saves valuable network resources such as, for example, bandwidth, cycles, etc. This is a reasonable assumption since the top HTML file controls which other pieces are included in the web page. By authenticating the top HTML file, we are assured, implicitly, that subsequent pieces will be fetched as intended; forgery would require subverting the legitimate web servers. This is a different security problem beyond the scope of this invention. Also, implementation of this methodology advantageously does not require HTTP version 1.1. In some instances, the Top URL may return a Top HTML that contains a re-direct or time-out, in which case, the browser will need to authenticate both pages. The re-direct may take a long time or never happen. But, in the mean time, the re-direct page may include some displayable information and clickable links. Note that a consequence of only authenticating top HTML files is that many pages will not be authenticatable—e.g., pages that consist of a single image; this is not a serious problem since HTML is required for the user to send information back to the server (which means any phishing attempt must use HTML).

This procedure of using serial numbers and encrypted checksums may be seen as cumbersome. But, it is necessary to have the server confirm that the Top HTML file is actually from the purported web server. It would be preferred to embed the checksum into the Top HTML file in a manner similar to the e-mail message authentication methodology. However, the very act of embedding the checksum into the Top HTML file would cause the checksum to change. Even if it was specified that the embedded checksum should be excluded from the checksum calculation, its presence would still result in checksum calculation issues. This is because, for dynamic pages, the web server cannot finish computing the checksum until the whole file has been generated and sent. Optionally, it can be specified that the encrypted checksum be sent after the whole Top HTML file is sent by making the checksum be part of the </body> tag or the </html> tag; but that requires changing the definition of HTML to allow tags outside the <html> </html> pair, or to perform complicated editing when computing the checksum.

By allowing access to the checksum via a serial number, webpage authentication in accordance with the present invention can be implemented in an add-on manner. For example, such add-on functionality looks at HTTP responses looking for HTML file with the <RealNameSerialNumber> tag. Whenever one is found, the checksum is computed and put into a database so that an information recipient device can query it later. Furthermore, it is also relatively easy to integrate this into add-on functionality into website/browser software.

In another embodiment, the checksum is as transmitted as part of HTTP protocol, as opposed to being part of the HTML file. While workable, this introduces linkages between the content of an HTML file and the protocol. Also, the signing operation becomes a bottleneck for the completion of the HTTP request. Furthermore, such a solution is also likely to be difficult to deploy because a lot of software enhancements must be made to achieve acceptable results. In another embodiment, the checksum is included as the last part of the HTML file. This can be implemented, for example, by defining a new HTML tag <RealNameChecksum> that comes after the </html> closing tag, and then specifying that the checksum should be computed excluding the <RealNameChecksum>. That is, take the HTML file, edit out the <RealNameChecksum> tag, and then compute the checksum. This solution is workable, but introduces the situation discussed above with respect to linkages between the content of an HTML file and the protocol, the signing operation becomes a bottleneck, and practical deployment being dependent upon software enhancements.

Alternatively, another webpage authentication methodology in accordance with the present invention includes making handling of authentication certificates independent of URL and HTML. Advantageously, this methodology requires no changes to any web pages (static or dynamic) and is capable of authenticating all pages, including pages consisting of a single image. Accordingly, it is a desirable alternative. The certificate handling can be done as a normal request to a pre-defined special URL. In detail: the HTTP 1.1 connection is setup as normally done (with or without standard SSL), the browser fetches the authentication certificate using a standard pre-defined URL, the certificate is checked, procession of private key checked. This confirms that the web server is legitimately acting for the owner of the certificate. A skilled person will understand that web servers hosting multiple domain names for a single corporate entity will particularly appreciate the easy implementation of this methodology.

It is also disclosed herein that the abovementioned webpage authentication methodologies can advantageously be combined. In such an embodiment, the first-described methodology can be applied. If the top HTML does not contain the tags that point to an authentication certificate, the second-described solution can be applied. Optionally, these two solutions can be applied in the opposite order. If either method produces authenticated identification information, an indication to that effect is presented. If either method produces an invalid certificate or bad private key confirmation, an indication of a possible forgery attempt should be presented. If neither method produces any message authentication (successful or otherwise), an indication of such authentication being unconfirmed should be presented.

The "special URL" is a standardized URL that web servers support for the purpose of authentication. For example, it maybe: "http://www.entity-name.com/$$RealName$$" so that when the top-level URL is in that domain (i.e., the URL start with "http://www.entity-name.com") the browser will ask the web server for "http://www.entity-name.com/RealName" to retrieve the corresponding RealName (i.e., authentication) certificate. The dollar signs are just a convention that many web masters use to indicate that this URL is "not a usual data page" and should be changed with caution. It should be noted that this approach works with servers not configured with authentication certificates configured in accordance with the present invention, in that they will return an error message such as '404—page not found' whereas a web server that is authentication-capable in accordance with the present invention will return the certificate accordingly.

IM Message Authentication

For instant messaging authentication, the problems are different again. However, they are mostly a subset of the unique functionality considerations associated with e-mail message authentication discussed above. One such consideration is that most IM systems have a central server that "mediates" between clients. Accordingly, clients do not communicate directly with other clients. This is essentially the same situation as the multi-hop nature of email. Another such consideration is that there are multiple different IM protocols, typically one for each vendor, and there are also many different User Agents for each IM protocol. Still another such consideration is that client pairs typically have to mutually add each other into their own authorized contact lists via a screen name exchange protocol, as opposed to email where total strangers can email each other.

Figure 7:
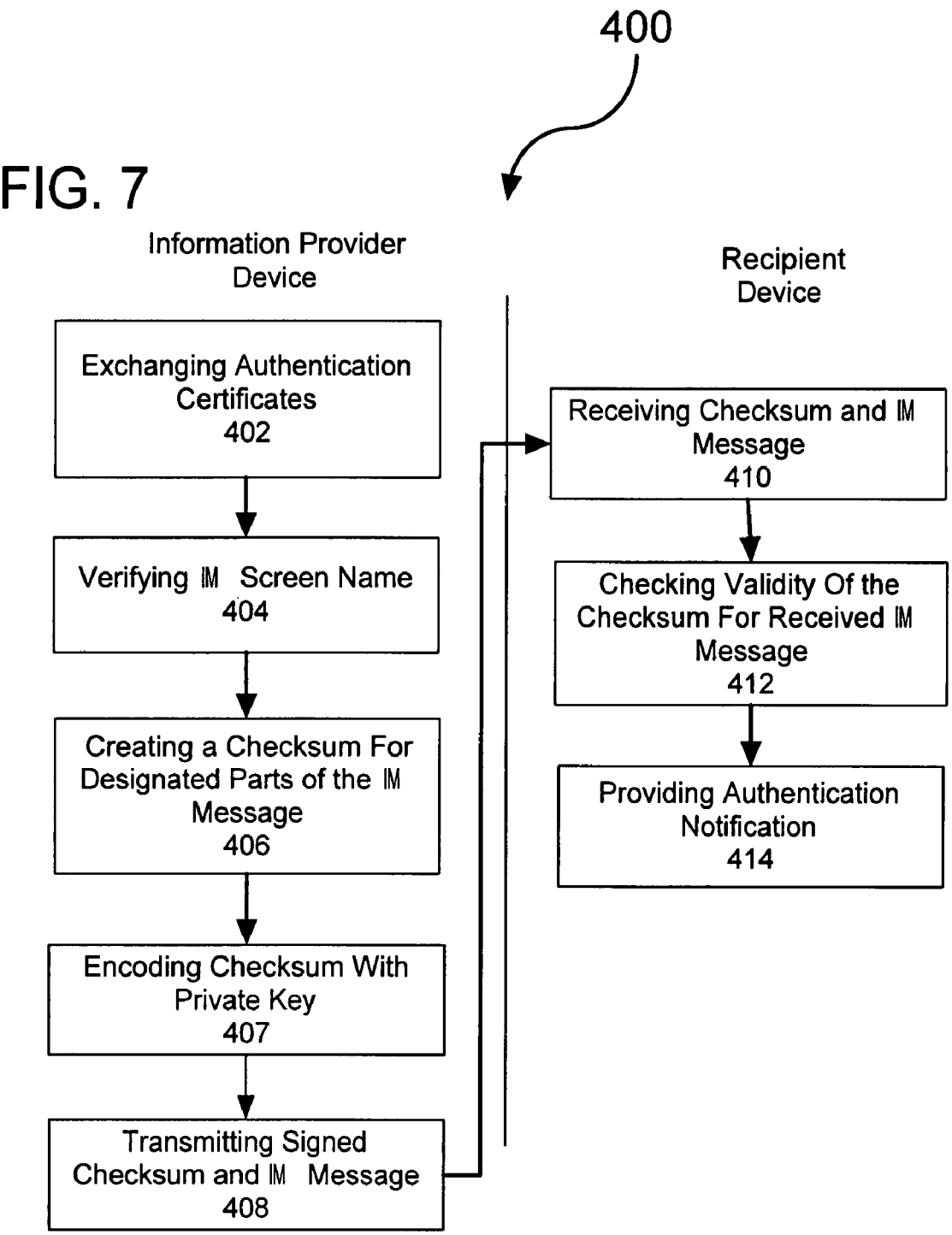
FIG. 7 is a flow chart showing an embodiment of an IM message authentication methodology in accordance with the present invention.

Accordingly, embodiments of the present invention that are configured for facilitating IM message authentication must address these unique functionality considerations and are configured in a similar spirit as the e-mail message authentication methodology disclosed above. To this end, in one embodiment of the present invention, the following IM message authentication methodology 400 shown in FIG. 7 is implemented by an IM enabled recipient device. As skilled person will appreciate that the details of implementation can be, by necessity, dependent on the specific underlying IM protocol.

1. An operation 402 is performed for exchanging authentication certificates between IM clients either on a per-IM dialog session or only at the time of adding an IM screen name to contact list. Exchanging authentication certificates on a per-IM dialog session has the merit of allowing an IM client to use different authenticated screen names for different chat sessions. Exchanging authentication certificates only at the time of adding an IM screen name to contact list saves the transmission of the authentication certificate in the IM message, which is advantageous as the authentication certificates is relatively 'bulky', and allows for authentication of the IM screen name at the time it is added.

2. After exchanging the authentication certificates, an operation 404 is performed for checking the IM screen name. This can be done by checking the IM screen name against the name embedded in the respective authentication certificate. This approach means the screen name is fixed at the time of issuing the certificate. Alternatively, the screen name is not embedded in the certificate and the checking can be done by signing the screen name; this has the advantage that multiple screen names can be used (perhaps certificate is for the "Tech Support" department and each technician has an individual screen name). If the authentication procedure fails, one or more corresponding notification actions can occur. Examples of these notification actions include, but are not limited to, adding the screen name can be denied, a user dialog window requesting confirmation to add the screen name can presented, the screen name can be flagged as unauthenticated and redirected in a specific "unauthenticated" group in the IM contact list, etc. The specific action can be designated as a characteristic of the IM client policy setting.
3. When an IM user start a chat session, an operation 406 is performed by a device from which an IM message is being sent (i.e., sender user device) for creating an checksum for designated parts of the IM message. In one embodiment, these parts include the actual message, the sender screen name and date/time information.
4. After creating the checksum, an operation 407 is performed for encoding the checksum with the private key corresponding to the certificate for producing an encoded checksum. This encoded checksum is the checksum that has been signed or encrypted by the private key corresponding to the certificate for enabling its authentication.
5. After encoding the checksum, an operation 408 is performed for transmitting the encoded checksum and IM message for reception by a device corresponding to a recipient screen name specified in the IM message (i.e., recipient user device).
6. After transmitting the encoded checksum, an operation 410 is performed by the recipient user device for receiving the encoded checksum.
7. After receiving the encoded checksum, an operation 412 is performed by the recipient user device to validate the encoded checksum, and for replicating and confirming the checksum using the authentication certificate of the information provider. The authentication certificate of the Info Provider is used for verifying validity of the encoded checksum. Validation of the encoded checksum is performed in the same manner as validation of the encoded checksum in the e-mail implementation disclosed above (e.g., checking a signature or decrypting the encoded checksum, replicating and confirming the checksum using the authentication certificate of the information provider, etc).
8. An operation 414 is performed for presenting notification information that indicates whether or not the checksum was successfully verified. If verification of the checksum fails, the screen name of the sender is flagged as unauthenticated and a notification is presented. Otherwise, the screen name is added and notification of a successful authentication is presented. As mentioned previously, a policy could dictate further actions to be taken.

It is disclosed herein that an information provider authentication application in accordance with the present invention can be functionally and/or physically segregated with respect to various functions. For example, in one embodiment, identification information identification verification functionality is provided via a first portion of the information provider authentication application and communication medium specific functionality is provided via one or more other portions of the information provider authentication application. More specifically, in one embodiment, identification information identification verification functionality is provided via a first portion of the information provider authentication application, e-mail authentication specific operations are provided via a second portion of the information provider authentication application, webpage authentication specific operations are provided via a third portion of the information provider authentication application and IM message specific operations are provided via a fourth portion of the information provider authentication application. To this end, the authentication applications in accordance with the present invention can be designed and maintained in a modular manner.

Referring now to instructions processible by a data communicating device in accordance with the present invention, it will be understood from the disclosures made herein that methods, processes and/or operations adapted for facilitating message content authentication and/or identification information functionality as disclosed herein are tangibly embodied by computer readable medium having instructions thereon that are configured for carrying out such functionality. In one specific embodiment, the instructions are tangibly embodied for carrying out one or more of the methodologies disclosed in reference to FIGS. 1-7. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon instructions (e.g., a computer program) adapted for facilitating carrying out message content authentication and/or identification information functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes maybe made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
   creating a certificate registry including authentication certificates issued to each one of a plurality of information providers and a root certificate corresponding to all of said authentication certificates, wherein each one of said authentication certificates links respective authentication information thereof to identification information of a corresponding one of said information providers, wherein each one of said authentication certificates is devoid of linkage between the corresponding one of said information providers and domain name information thereof, and wherein said authentication certificates of the certificate registry are associated in a manner at least partially dependent upon at least one of a particular type of information that said information providers provide, a particular organization that said information providers are associated with, a particular type profession in which said information providers are engaged and a particular geographical region in which said information providers are located;

providing the root certificate to an information recipient; and facilitating verification of a webpage accessed by the information recipient and having an authentication certificate associated therewith, wherein said verification includes successfully verifying authenticity of said associated authentication certificate using authentication information contained in the root certificate thereby verifying that said associated authentication certificate belongs to the certificate registry and, after said successfully verifying authenticity of said associated authentication certificate, successfully verifying identity of a designated owner of the webpage using authentication information contained in said associated authentication certificate.

2. The method of claim 1 wherein said identification information includes at least one of a name by which a respective one of said information providers is recognized, an image specific to a respective one of said information providers, text specific to a respective one of said information providers, and a sound specific to a respective one of said information providers.

3. The method of claim 1 wherein said identification information includes at least one of a protected name of a respective one of said information providers, a protected image of a respective one of said information providers, protected text of a respective one of said information providers, and protected sound of a respective one of said information providers.

4. The method of claim 1 wherein:

providing the root certificate to the information recipient is performed in response to the information recipient expressly requesting the root certificate; and the root certificate corresponds to at least one of a particular type of information, a particular organization, a particular type profession and a particular geographical region.

5. The method of claim 4 wherein said identification information includes at least one of a protected name of a respective one of said information providers, a protected image of a respective one of said information providers, protected text of a respective one of said information providers, and protected sound of a respective one of said information providers.

6. The method of claim 4 wherein facilitating verification of the webpage accessed by the information recipient includes:

retrieving said associated authentication certificate from a web server;

verifying that the web server has a matching key to the authentication certificate; and acknowledging authenticity of the webpage in response to determining that the authentication certificate is valid and that the web server has the matching key thereby verifying that a web page communicating channel between the web server and the information recipient is authentic.

7. The method of claim 4 wherein:

facilitating verification of the webpage accessed by the information recipient includes retrieving a file representing the webpage from a web server;

the file includes a serial number of the webpage and said associated authentication certificate;

verifying that the file was sent from the web server and that the web server has a matching key to the authentication certificate includes:

sending the serial number to the web server, receiving a checksum of the file from the server that is signed with a private key of the authentication certificate; and determining if the confirmation checksum received from the server matches that of a checksum created using the received file; and determining if the authentication certificate is signed by the private key of the root certificate.

8. The method of claim 7 wherein the file designates an authentication certificate associated with the webpage.

9. The method of claim 8, further comprising:

caching said associated authentication certificate after retrieving said associated authentication certificate, thereby precluding repeated retrieval of said authentication certificate.

10. A certificate registry, comprising:

authentication certificates issued to each one of a plurality of information providers; and a root certificate corresponding to all of said authentication certificates;

wherein each one of said authentication certificates links respective authentication information thereof to identification information of a corresponding one of said information providers;

wherein each one of said authentication certificates is devoid of linkage between the corresponding one of said information providers and domain name information thereof; and wherein said authentication certificates of the certificate registry which is stored on a tangible computer readable storage medium are associated in a manner at least partially dependent upon at least one of a particular type of information that said information providers provide, a particular organization that said information providers are associated with, a particular type profession in which said information providers are engaged and a particular geographical region in which said information providers are located.

11. The registry of claim 10 wherein said identification information includes at least one of a name by which a respective one of said information providers is recognized, an image specific to a respective one of said information providers, text specific to a respective one of said information providers, and a sound specific to a respective one of said information providers.

12. The registry of claim 10 wherein said identification information includes at least one of a protected name of a respective one of said information providers, a protected image of a respective one of said information providers, protected text of a respective one of said information providers, and protected sound of a respective one of said information providers.

13. A certificate registry system configured to: issue authentication certificates issued to each one of a plurality of information providers and maintain a root certificate corresponding to all of said authentication certificates, wherein each one of said authentication certificates links respective authentication information thereof to identification information of a corresponding one of said information providers, wherein each one of said authentication certificates is devoid of linkage between the corresponding one of said information providers and domain name information thereof, and wherein said authentication certificates of the certificate registry system which is stored on a tangible computer readable storage medium are associated in a manner at least partially dependent upon at least one of a particular type of information that said information providers provide, a particular organization that said information providers are associated with, a particular type profession in which said information providers are engaged and a particular geographical region in which said information providers are located.

14. The certificate registry system of claim 13 wherein said identification information includes at least one of a name by which a respective one of said information providers is recognized, an image specific to a respective one of said information providers, text specific to a respective one of said information providers, and a sound specific to a respective one of said information providers.

15. The certificate registry system of claim 13 wherein said identification information includes at least one of a protected name of a respective one of said information providers, a protected image of a respective one of said information providers, protected text of a respective one of said information providers, and protected sound of a respective one of said information providers.

16. The certificate registry system of claim 13 further configured to provide the root certificate to an information recipient in response to the information recipient expressly requesting the root certificate, wherein the root certificate corresponds to at least one of a particular type of information, a particular organization, a particular type profession and a particular geographical region.

17. The certificate registry system of claim 16 wherein said identification information includes at least one of a protected name of a respective one of said information providers, a protected image of a respective one of said information providers, protected text of a respective one of said information providers, and protected sound of a respective one of said information providers.

18. The certificate registry system of claim 17 further configured to facilitating verification of a webpage accessed by the information recipient and having an authentication certificate associated therewith, wherein said verification includes successfully verifying authenticity of said associated authentication certificate using authentication information contained in the root certificate thereby verifying that said associated authentication certificate belongs to the certificate registry and, after said successfully verifying authenticity of said associated authentication certificate, successfully verifying identity of a designated owner of the webpage using authentication information contained in said associated authentication certificate.

19. The certificate registry system of claim 18 wherein facilitating verification of the webpage accessed by the information recipient includes:
retrieving said associated authentication certificate from a web server;
verifying that the web server has a matching key to the authentication certificate; and
acknowledging authenticity of the webpage in response to determining that the authentication certificate is valid and that, the web server has the matching key thereby verifying that a web page communicating channel between the web server and the information recipient is authentic.

20. The certificate registry system of claim 18 wherein:
facilitating verification of the webpage accessed by the information recipient includes retrieving a file representing the webpage from a web server,
the file includes a serial number of the webpage and said associated authentication certificate;
verifying that the file was sent from the web server and that the web server has a matching key to the authentication certificate includes sending the serial number to the server, receiving a checksum of the file from the server that is signed with a private key of the authentication certificate, determining if the confirmation checksum received from the server matches that of a checksum created using the received file, and determining if the authentication certificate is signed by the private key of the root certificate.

21. The certificate registry system of claim 20 wherein the file designates an authentication certificate associated with the webpage.

22. The certificate registry system of claim 20 further configured to cache said associated authentication certificate after retrieving said associated authentication certificate, thereby precluding repeated retrieval of said authentication certificate.

* * * * *